Sept. 29, 1936.  B. C. TRACEY  2,056,027

EYE PROTECTING SCREEN

Filed March 27, 1934

Coated with a transparent alkyd resin

Inventor:
Bernard C. Tracey,
by Harry E. Dunham
His Attorney.

Patented Sept. 29, 1936

2,056,027

UNITED STATES PATENT OFFICE 2,056,027

EYE PROTECTING SCREEN

Bernard C. Tracey, Schenectady, N. Y., assignor to General Electric Company, a corporation of New York Application March 27, 1934, Serial No. 717,600

6 Claims. (Cl. 2—8)

My invention relates to eye protecting screens such as are employed in head and face shields used by welders and metal workers.

These face shields are generally constructed of some non-inflammable material which is dead black in color in order to reduce light reflection. They are provided with an eye protecting screen or window of transparent material which absorbs the infra-red rays, the ultra-violet rays, and part of the visible rays emanating from the molten metal or the arc with which the operator is working. At the same time these screens are of such a nature as to permit good visibility without tiring the operator's eyes.

In order to protect these screens from flying sparks and particles of molten metal a relatively inexpensive clear glass cover is usually placed over them. These cover glasses are replaced from time to time when they become badly pitted due to the flying sparks or molten metal impinging thereon. The useful life of these glasses depends on the type of work being performed by the operator. Generally, in a few hours' use, they soon become so badly pitted that they seriously impair the operator's vision. Much time is consumed in replacing badly pitted cover glasses with new glasses, and the operator usually works under an eye strain hazard during 75 percent of the time that the usual cover glass is used before being replaced by a new one.

It is an object of my invention to provide an improved transparent protective sheet or covering for the window of an arc welding shield.

It is a further object of my invention to provide a cover glass having a surface coating which greatly increases its useful life and greatly reduces the eye strain hazard above referred to.

Figure 1:
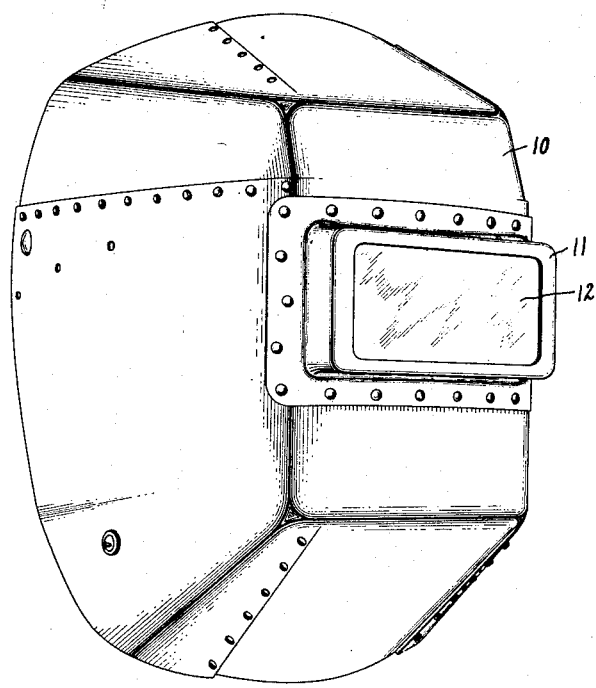
Figure 2:
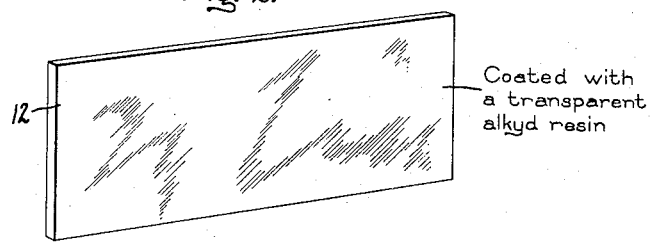

Further objects of my invention will appear from the following description taken in connection with the accompanying drawing Fig. 1 of which illustrates a head shield such as employed by arc welders, and Fig. 2 of which illustrates a cover glass embodying the features of my invention.

The head shield illustrated in Fig. 1 is formed of fibre or other non-inflammable, heat-resisting, opaque material 10 cut, bent and overlapped to form a shield which when worn by the welder completely surrounds his face and provides protection from the intense heat of the work, injurious light rays and flying sparks and particles of molten metal. The front part of the shield is provided with a window 11 through which the welder may view the arc and work being welded without danger of injury to his eyes. Within this window is located a screen or lens which absorbs the infra-red rays, the ultra-violet rays, and part or most of the visible rays emanating from the arc. This screen or lens is often referred to as a filter glass and is protected by a cover glass 12 which in accordance with my invention is coated with a transparent alkyd resin. This coating forms a transparent sheet of non-inflammable organic compound which protects the cover glass from flying sparks and particles and greatly increases its useful life.

As is known, resins of the alkyd type include all those complexes resulting primarily from the interaction of a polyhydric alcohol and a polybasic acid with or without other reacting ingredients. The most familiar example of a resin of this type is that obtained by the reaction of glycerine and phthalic anhydride. A resin of this type in the form of a thin film, when heated in the air to about 200 to 380° C., evaporates quickly without leaving any carbonaceous residue. The glycerine disappears as carbon dioxide and water and the phthalic anhydride probably as such. Such a resin does not explode or conflagrate as does nitrocellulose, and unlike most of the organic binders, does not leave a tarry residue.

A suitable covering is composed of about 70 percent cellulose nitrate and 30 percent of a composition consisting of 30 percent castor oil and 70 percent of phthalic anhydride and glycerine. The cover glasses are dipped into a bath of this material and dried for 10 to 20 minutes in an oven at a temperature between 60 and 80° C. The covering thus applied to the glass is a thin film or sheet of approximately .0005 of an inch in thickness.

A glass so coated has from 5 to 10 times the life of an uncoated glass when subjected to flying sparks and particles of molten metal such as encountered in arc welding or similar metallurgical operations. Furthermore, an eye strain hazard is present for less than 15 percent of its useful life as compared to the usual eye strain hazard with untreated glass which is present during about 75 percent of its use. As it requires about 10 minutes to remove and replace a badly pitted cover glass, the use of treated cover glasses by reason of their longer useful life eliminates any great loss of time due to frequent renewals required with uncoated glasses.

The coating of alkyd resin apparently volatilizes under the action of flying sparks and molten particles impinging thereon and prevents these articles from attaching themselves to the surface of the glass. It is possible that the heat conductivity of the alkyd resin assists in the self clearing action which this material gives to the cover glass to which it is applied. It is, of course, apparent that the other materials having the heat conducting and volatilizing characteristics of an alkyd resin could be used in place thereof. Alkyd resins are commercially available under the trade name of "Glyptal" lacquers.

It is of course apparent that the screens employed for absorbing the visible and invisible light rays which seriously affect the operator's vision may themselves be coated with a transparent alkyd resin, but I prefer to employ cover glasses to protect these screens and to coat the cover glass with a transparent alkyd resin as above described. It is usually most convenient to coat the entire surface of the cover glass, and this is preferable since in use it is difficult to tell the coated glass from an uncoated glass. It is, of course, apparent that by using suitable surface identification only that surface of a cover glass exposed and subject to flying sparks and particles of molten metal need be covered with the coating of alkyd resin.

What I claim as new and desire to secure by Letters Patent of the United States, is:

1. A transparent visual member having a surface exposed and subjected to flying sparks and particles of molten metal, said exposed surface being coated with a transparent alkyd resin.

2. A transparent visual member having a surface exposed and subjected to flying sparks and particles of molten metal, said member being formed of glass and having its exposed surface coated with a thin film of transparent alkyd resin.

3. A transparent visual member having a surface exposed and subjected to flying sparks and particles of molten metal, said exposed surface being coated with a thin film of transparent material having the heat conducting and volatilizing characteristics of an alkyd resin.

4. A welder's shield of non-inflammable heat resisting opaque material the front part of which is provided with a window closed by a transparent visual member through which the welder may view the welding operation without danger of injuring his eyes, the surface of said visual member which is exposed and subjected to flying sparks and particles of molten metal being coated with a transparent alkyd resin.

5. An arc welding shield comprising a window, including a filter glass and a protective sheet for said window, comprising a transparent sheet of a non-inflammable organic compound covering the surface of said window adapted to be exposed to the welding arc.

6. An arc welding shield comprising a window, including a filter glass, a cover glass adjacent said filter glass, and a protective sheet for said window, comprising a transparent sheet of a non-inflammable organic compound adjacent said cover glass.

BERNARD C. TRACEY.